(12) United States Patent
Toda et al.

(10) Patent No.: US 7,922,325 B2
(45) Date of Patent: Apr. 12, 2011

(54) OPTICAL ARTICLE AND METHOD FOR PRODUCING THE SAME

(75) Inventors: Mitsuhiro Toda, Minamiminowa-mura (JP); Yuta Hoshino, Minowa-machi (JP)

(73) Assignee: Seiko Epson Corporation, Tokyo (JP)

( * ) Notice: Subject to any disclaimer, the term of this patent is extended or adjusted under 35 U.S.C. 154(b) by 8 days.

(21) Appl. No.: 12/603,421

(22) Filed: Oct. 21, 2009

(65) Prior Publication Data

US 2010/0134753 A1 Jun. 3, 2010

(30) Foreign Application Priority Data

Dec. 1, 2008 (JP) ................................. 2008-306048

(51) Int. Cl.
G02C 7/10 (2006.01)
(52) U.S. Cl. ........................... 351/163; 351/44; 351/177
(58) Field of Classification Search .................... 351/44, 351/163, 177
See application file for complete search history.

(56) References Cited

U.S. PATENT DOCUMENTS

| | | | | | |
|---|---|---|---|---|---|
| 5,054,902 | A | * | 10/1991 | King | 351/44 |
| 5,242,740 | A | * | 9/1993 | Rostaing et al. | 428/212 |
| 7,332,213 | B2 | | 2/2008 | Mimura et al. | |

FOREIGN PATENT DOCUMENTS

| | | |
|---|---|---|
| EP | 1494049 A2 | 1/2005 |
| JP | 07-056002 | 3/1995 |
| JP | 09-113702 | 5/1997 |
| JP | 2007253512 A | 10/2007 |

OTHER PUBLICATIONS

European search report for corresponding European application 09177316.8, Feb. 2010.

* cited by examiner

*Primary Examiner* — Scott J Sugarman
(74) *Attorney, Agent, or Firm* — DLA Piper LLP (US)

(57) ABSTRACT

An optical article includes: an optical substrate, and a functional layer that is light-transmissive and is laminated to the surface of the optical substrate, the period Pk ($nm^{-1}$) of reflectance of the functional layer in the k-space being not more than $3.66 \times 10^{-5}$.

17 Claims, 11 Drawing Sheets

| NBS SCALE | PERCEPTION OF COLOR DIFFERENCE | |
|---|---|---|
| 0.0 ~ 0.5 | trace | BARELY PERCEPTIBLE |
| 0.5 ~ 1.5 | slight | SLIGHTLY PERCEPTIBLE |
| 1.5 ~ 3.0 | noticeable | APPRECIABLE |
| 3.0 ~ 6.0 | appreciable | NOTICEABLE |
| 6.0 ~ 12.0 | much | LARGE |
| 12.0 以上 | very much | EXTREMELY LARGE |

FIG. 9

| No. | BOARD REFRACTIVE INDEX | FILM REFRACTIVE INDEX (REFRACTIVE INDEX DIFFERENCE) | FILM THICKNESS (nm) | INTERFERENCE FRINGES | Eab | PERCEPTION OF COLOR DIFFERENCE (ΔE*ab) ON THE NBS SCALE (NATIONAL BUREAU OF STANDARDS) | SIMULATION RESULT, dEav | SIMULATION RESULT, PERIOD Pk nm$^{-1}$ |
|---|---|---|---|---|---|---|---|---|
| E1 | 1.67 | 1.55 (0.12) | 12000 | EXCELLENT | 0.35 | trace | 0.28 | $2.69 \times 10^{-5}$ |
| E2 | 1.67 | 1.55 (0.12) | 17000 | EXCELLENT | 0.12 | trace | 0.15 | $1.90 \times 10^{-5}$ |
| E3 | 1.74 | 1.55 (0.19) | 9500 | GOOD | 0.64 | slight | 0.71 | $3.40 \times 10^{-5}$ |
| E4 | 1.74 | 1.55 (0.19) | 25000 | EXCELLENT | 0.08 | trace | 0.11 | $1.29 \times 10^{-4}$ |
| R1 | 1.67 | 1.55 (0.12) | 3000 | POOR | 3.54 | noticeable | 3.76 | $1.08 \times 10^{-4}$ |
| R2 | 1.74 | 1.55 (0.19) | 2000 | POOR | 5.70 | much | 6.83 | $1.61 \times 10^{-4}$ |

FIG. 10

| MODEL | D1 | D2 | D3 | D4 | D5 | D6 | D7 | D8 | D9 | D10 |
|---|---|---|---|---|---|---|---|---|---|---|
| FILM REFRACTIVE INDEX n1 | 1.90 | 1.80 | 1.78 | 1.50 | 1.56 | 1.50 | 1.50 | 1.50 | 1.50 | 1.50 |
| FILM THICKNESS nm T | 9100 | 10000 | 9100 | 9100 | 10000 | 9100 | 9100 | 9100 | 9100 | 10000 |
| BOARD REFRACTIVE INDEX n2 | 1.50 | 1.56 | 1.60 | 1.67 | 1.70 | 1.74 | 1.78 | 1.80 | 1.90 | 1.67 |
| PERIOD (×10$^{-5}$) nm$^{-1}$ Pk | 2.89 | 2.78 | 3.09 | 3.66 | 3.21 | 3.66 | 3.66 | 3.66 | 3.66 | 3.33 |
| dEav | 0.78 | 0.48 | 0.46 | 0.79 | 0.46 | 1.05 | 1.18 | 1.23 | 1.48 | 0.65 |

FIG.11

| REFERENCE MODEL | RD1 | RD2 | RD3 | RD4 | RD5 |
|---|---|---|---|---|---|
| FILM REFRACTIVE INDEX n1 | 1.50 | 1.50 | 1.50 | 1.50 | 1.50 |
| FILM THICKNESS nm T | 9000 | 8500 | 8300 | 8000 | 7600 |
| BOARD REFRACTIVE INDEX n2 | 1.90 | 1.80 | 1.78 | 1.74 | 1.70 |
| PERIOD ($\times 10^{-5}$) $nm^{-1}$ Pk | 3.70 | 3.92 | 4.02 | 4.17 | 4.39 |
| $\Delta E$ dEav | 1.53 | 1.51 | 1.58 | 1.59 | 1.59 |

FIG.12

| MODEL | D11 | D12 | D13 | D14 | D15 | D16 | D17 | D18 | D19 | D20 |
|---|---|---|---|---|---|---|---|---|---|---|
| FILM REFRACTIVE INDEX n1 | 1.90 | 1.78 | 1.74 | 1.50 | 1.60 | 1.50 | 1.60 | 1.50 | 1.50 | 1.50 |
| FILM THICKNESS nm T | 11000 | 15000 | 13000 | 11000 | 15000 | 11000 | 13000 | 11000 | 11000 | 15000 |
| BOARD REFRACTIVE INDEX n2 | 1.50 | 1.56 | 1.60 | 1.67 | 1.70 | 1.74 | 1.78 | 1.80 | 1.90 | 1.67 |
| PERIOD ($\times 10^{-5}$) $nm^{-1}$ Pk | 2.39 | 1.87 | 2.21 | 3.03 | 2.08 | 3.03 | 2.40 | 3.03 | 3.03 | 2.22 |
| dEav | 0.54 | 0.23 | 0.26 | 0.49 | 0.14 | 0.65 | 0.30 | 0.76 | 0.92 | 0.32 |

FIG.13

| REFERENCE MODEL | RD11 | RD12 | RD13 | RD14 |
|---|---|---|---|---|
| FILM REFRACTIVE INDEX n1 | 1.50 | 1.50 | 1.50 | 1.50 |
| FILM THICKNESS nm T | 9300 | 9800 | 10000 | 10600 |
| BOARD REFRACTIVE INDEX n2 | 1.74 | 1.78 | 1.80 | 1.90 |
| PERIOD (×10$^{-5}$) nm$^{-1}$ Pk | 3.58 | 3.40 | 3.33 | 3.14 |
| ΔE dEav | 1.01 | 1.02 | 1.02 | 1.03 |

FIG.14

| MODEL | D21 | D22 | D23 | D24 | D25 | D26 | D27 | D28 | D29 | D30 |
|---|---|---|---|---|---|---|---|---|---|---|
| FILM REFRACTIVE INDEX n1 | 1.90 | 1.70 | 1.74 | 1.50 | 1.63 | 1.50 | 1.63 | 1.50 | 1.50 | 1.50 |
| FILM THICKNESS nm T | 16000 | 18000 | 20000 | 16000 | 18000 | 16000 | 20000 | 16000 | 16000 | 20000 |
| BOARD REFRACTIVE INDEX n2 | 1.50 | 1.56 | 1.60 | 1.67 | 1.70 | 1.74 | 1.78 | 1.80 | 1.90 | 1.67 |
| PERIOD (×10$^{-5}$) nm$^{-1}$ Pk | 1.64 | 1.63 | 1.44 | 2.08 | 1.70 | 2.08 | 1.53 | 2.08 | 2.08 | 1.67 |
| dEav | 0.29 | 0.12 | 0.09 | 0.25 | 0.07 | 0.33 | 0.11 | 0.39 | 0.47 | 0.18 |

| MODEL | D31 | D32 | D33 | D34 | D35 | D36 | D37 | D38 | D39 | D40 |
|---|---|---|---|---|---|---|---|---|---|---|
| FILM REFRACTIVE INDEX n1 | 1.90 | 1.60 | 1.67 | 1.50 | 1.63 | 1.50 | 1.60 | 1.50 | 1.50 | 1.50 |
| FILM THICKNESS nm T | 21000 | 23000 | 22000 | 21000 | 23000 | 21000 | 22000 | 21000 | 21000 | 23000 |
| BOARD REFRACTIVE INDEX n2 | 1.50 | 1.56 | 1.60 | 1.67 | 1.70 | 1.74 | 1.78 | 1.80 | 1.90 | 1.67 |
| PERIOD (×10⁻⁵) nm⁻¹ Pk | 1.25 | 1.36 | 1.36 | 1.59 | 1.33 | 1.59 | 1.42 | 1.59 | 1.59 | 1.45 |
| dEav | 0.19 | 0.02 | 0.04 | 0.16 | 0.04 | 0.21 | 0.11 | 0.25 | 0.30 | 0.13 |

FIG.15

| MODEL | D41 | D42 | D43 | D44 | D45 | D46 | D47 | D48 | D49 | D50 |
|---|---|---|---|---|---|---|---|---|---|---|
| FILM REFRACTIVE INDEX n1 | 1.90 | 1.63 | 1.70 | 1.50 | 1.60 | 1.50 | 1.56 | 1.50 | 1.50 | 1.50 |
| FILM THICKNESS nm T | 24000 | 27000 | 30000 | 24000 | 27000 | 24000 | 30000 | 24000 | 24000 | 30000 |
| BOARD REFRACTIVE INDEX n2 | 1.50 | 1.56 | 1.60 | 1.67 | 1.70 | 1.74 | 1.78 | 1.80 | 1.90 | 1.67 |
| PERIOD (×10⁻⁵) nm⁻¹ Pk | 1.10 | 1.14 | 0.98 | 1.39 | 1.16 | 1.39 | 1.07 | 1.39 | 1.39 | 1.11 |
| dEav | 0.13 | 0.03 | 0.04 | 0.11 | 0.05 | 0.14 | 0.09 | 0.17 | 0.20 | 0.09 |

FIG.16

OPTICAL ARTICLE AND METHOD FOR PRODUCING THE SAME

BACKGROUND

1. Technical Field

The present invention relates to an optical article with at least one side thereof facing the outside, such as a spectacle lens, and also to a method for producing the same.

2. Related Art

JP-A-9-113702 (Patent Document 1) describes provision of an optical article provided with a coating that has high environmental resistance and can be made transparent. For this purpose, a degeneration layer and a hard coating layer are formed on a transparent resin substrate by CVD; the degeneration layer contains at least one of Si and Ti and has a refractive index varying in the thickness direction, while the hard coating layer contains Si and O. The hard coating layer is described to have a thickness of not less than 0.4 μm and not more than 5 μm.

JP-A-7-56002 (Patent Document 2) describes uniform reduction of the reflectance of a plastic board over a wide range. It is described that for this purpose, when forming a hard coating layer on a plastic board to protect the plastic board in terms of strength, the hard coating layer is formed to have substantially the same refractive index as the refractive index of the plastic board at the portion where the hard coating layer comes in contact with the plastic board, and also that the refractive index of the hard coating layer varies continuously or gradually in the thickness direction.

Optical substrates made of plastic, such as plastic lenses, are lightweight as compared with glass lenses, which are one kind of optical substrates made of glass, and also have excellent formability, workability, and dyeing affinity, together with low breakability and high safety. Accordingly, they are widely used in the field of spectacle lenses. The plastic material (CR-39) developed by PPG Industries, U.S., in the 1940's has, as a spectacle lens material, an excellent balance of physical properties. Up to now, the plastic material (CR-39) has been long used as a material for plastic lenses. However, the refractive index thereof is as low as 1.50, and there are problems that in the case of lenses with minus power, such a lens has a large edge thickness, while in the case of plus lenses, the thickness at the center thereof is large.

In order to reduce the thickness of a plastic lens, the refractive index of the substrate has to be increased. The refractive index of plastic materials has been increased from 1.50 to 1.56, 1.60, 1.67, 1.70, 1.74, and 1.76, and thus materials with a high refractive index have been developed. Nowadays, plastic spectacle lenses of various refractive indexes are commercially available.

Optical substrates made of plastic are prone to scratches. To make up for this problem, a layer (film) called hard coating is often formed on the surface of the substrate to prevent scratches. The thickness of such a hard coating is approximately 1 to 5 μm. Materials typically used for forming the hard coating layer are thermosetting silicon-based resins and UV-curable organic resins. The refractive index of these materials is about 1.50 to about 1.55. When a thin layer is formed on a plastic substrate with a high refractive index (e.g., 1.60 or more), interference fringes are formed due to the difference in refractive index and nonuniformity in the thickness.

In a spectacle lens, such interference fringes will not affect the optical performance of the lens itself, but they degrade the appearance or cause reflected glare. Accordingly, in order to increase the commercial value, elimination of interference fringes is desired. In particular, although plastic lenses having a ultra-high refractive index (e.g., 1.70 or more) has a significant advantage of allowing production of thin, lightweight spectacle lenses, the resulting interference fringes are denser and more apparent.

One method for suppressing the formation of interference fringes is to form a hard coating layer containing a metal oxide for adjusting refractive index, so that the refractive indexes of the hard coating layer and the plastic lens substrate are comparable. For example, according to the above Patent Documents 1 and 2, the refractive index varies in the thickness direction so that there is no or little difference in refractive index at the portion where the hard coating layer and the plastics base material are in contact with each other, thereby reducing the reflectance. Further, the thickness is reduced so that the refractive index continuously varies. Accordingly, the refractive index of the surface is lowered, thereby reducing the reflectance. In this method, complete suppression of interference fringes requires a special hard coating to be designed, managed, and constructed for every substrate. However, for the production of coatings with various refractive indexes, a manufacturing facility is required for each case. This imposes a heavy burden on manufacturers.

In addition, although the original purpose of the hard coating layer is not to adjust the refractive index to suit a substrate, but to serve as a layer that imparts the substrate with weather resistance, abrasion resistance, and like various characteristics, as the refractive index of the layer increases, it becomes difficult to satisfy all these conditions.

Further, in many cases, an antireflection film is formed on the hard coating layer. When the refractive index of the hard coating layer differs, a special antireflection film also has to be designed for each case. Accordingly, even when the refractive index of a plastic lens is increased, thin, lightweight spectacle lenses and spectacles cannot necessarily be provided, and it is difficult to satisfy all the various quality characteristics.

SUMMARY

One aspect of the invention provides an optical article comprising an optical substrate and a functional layer that is light-transmissive and is laminated to the surface of the optical substrate, the period Pk ($nm^{-1}$) of reflectance (reflection coefficient) of the functional layer in the k-space being not more than $3.66 \times 10^{-5}$. The k-space is the wavenumber ($1/\lambda$) space. In general, the function that is the ($1/\lambda$) expression of the reflectance R of a thin layer laminated on an optical substrate, i.e., reflectance R(k) in the k-space, oscillates with a constant period Pk.

In accordance with the aspect of the invention, instead of reducing the functional layer thickness, the functional layer is defined with the period Pk of reflectance R(k), whereby appearance of interference fringes can be suppressed and/or human perception of interference fringes can be suppressed. In the case where the period Pk of reflectance R(k) exceeds the above value, when the optical article is observed using a light source equivalent to a three band daylight fluorescent, color difference due to interference fringes is highly likely to be appreciable because of nonuniformity in the thickness of the functional layer. Such a case is thus undesirable.

It is preferable that the period Pk of reflectance R(k) of the functional layer is not more than $3.03 \times 10^{-5}$. Although color difference due to interference fringes may be slightly perceptible, the degree thereof is smaller.

Further, it is preferable that the period Pk of reflectance R(k) of the functional layer is not more than $2.08 \times 10^{-5}$. Color difference due to interference fringes is mitigated to the degree that the difference is barely perceptible.

Further, it is preferable that the period Pk of reflectance R(k) of the functional layer is not more than $1.59 \times 10^{-5}$. Although color difference due to interference fringes may be barely perceptible, the degree thereof is smaller.

Further, it is preferable that the period Pk of reflectance R(k) of the functional layer is not more than $1.39 \times 10^{-5}$. Almost no color difference due to interference fringes is observable.

Further, it is preferable that the period Pk of reflectance R(k) of the functional layer is not less than $2.63 \times 10^{-6}$. In the case where the period Pk of reflectance R(k) is below this value, such a functional layer is too thick, and this makes it difficult to maintain the surface accuracy. Accordingly, cracks are expected due to the volume change caused by drying during film formation. Such a case is thus undesirable. Further, it is preferable that the period Pk of reflectance R(k) of the functional layer is not less than $5.26 \times 10^{-6}$. Accordingly, the surface accuracy of the functional layer can be more easily achieved, and the degree of perception of color difference due to interference fringes can be reduced.

A typical functional layer contains a hard coating layer. The functional layer maybe a multilayer film, and may contain, for example, in addition to the hard coating layer, a primer layer laminated between the hard coating layer and the optical substrate. Further, the optical article may have an antireflection film laminated on the functional layer. The optical article may also have an antifouling film laminated on the antireflection film.

A typical optical substrate is a plastic lens substrate, for example, a spectacle lens.

Another aspect of the invention provides a pair of spectacles comprising the above spectacle lens and a frame to which the spectacle lens is mounted.

Still another aspect of the invention provides a system including the above optical article that faces the outside and for seeing an image through the optical article. Typical examples of such systems are televisions, displays, windows, and the like.

Still another aspect of the invention provides a method for producing an optical article, including forming a light-transmissive functional layer on the surface of an optical substrate, the period Pk ($nm^{-1}$) of reflectance of the functional layer in the k-space being not more than $3.66 \times 10^{-5}$.

Still another embodiment of the invention provides a method for film formation, including forming a light-transmissive functional layer on the surface of an optical substrate, the period Pk ($nm^{-1}$) of reflectance of the functional layer in the k-space being not more than $3.66 \times 10^{-5}$.

BRIEF DESCRIPTION OF THE DRAWINGS

The invention will be described with reference to the accompanying drawings, wherein like numbers reference like elements.

FIG. 9 shows Examples and Comparative Examples.

FIG. 10 shows models D1 to D10, where the color difference average dEav at least falls under category 1 (not more than 1.5).

FIG. 11 shows reference models RD1 to RD5, where the color difference average dEav is not less than 1.5.

FIG. 12 shows models D11 to D20, where the color difference average dEav at least falls under category 2 (not more than 1.0).

FIG. 13 shows reference models RD11 to RD14, where the color difference average dEav is not less than 1.0.

FIG. 14 shows models D21 to D30, where the color difference average dEav at least falls under category 3 (not more than 0.5).

FIG. 15 shows models D31 to D40, where the color difference average dEav at least falls under category 4 (not more than 0.3).

FIG. 16 shows models D41 to D50, where the color difference average dEav at least falls under category 5 (not more than 0.2).

DESCRIPTION OF EXEMPLARY EMBODIMENTS

Cause of Interference Fringes

Figure 1:
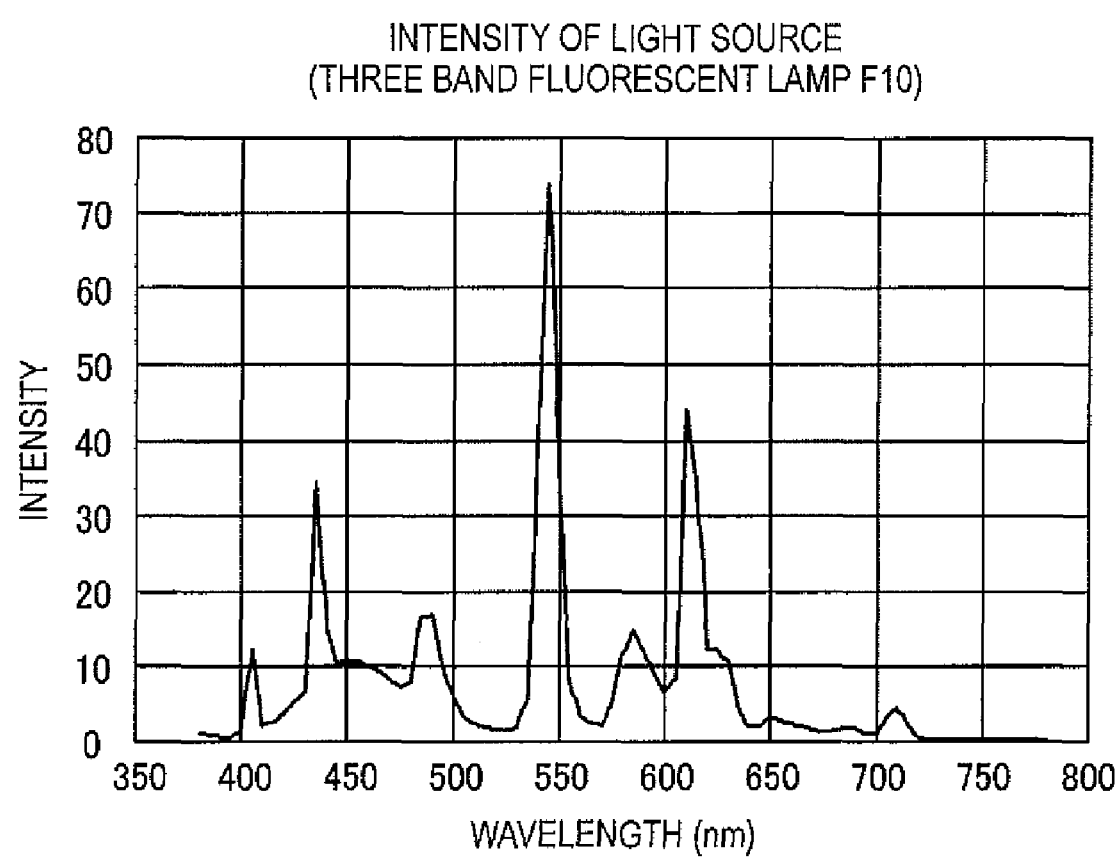
FIG. 1 shows an example of spectral distribution of light source (F10).

One of the fundamental causes of interference fringes is difference in refractive index. Therefore, in an attempt to eliminate interference fringes, adjustment of refractive index has been employed. However, the wavelength dependence of refractive index is disregarded in most cases. That is to say, the refractive index of a plastic substrate and the refractive index of a hard coating layer can be approximated, or, at a certain wavelength, can also be matched. However, when the material is different, the refractive index at each wavelength of light also differs, and it thus is nearly impossible to match the refractive indexes at every wavelength. The refractive index distribution in the visible wavelength region (380 to 780 nm) is usually such that the refractive index is low on the long-wavelength side (the 780 nm side) and is high on the short-wavelength side (the 380 nm side). Typically, as refractive index, one at the e-line (546 nm) is used. Unless otherwise noted, the refractive index herein also means the refractive index at the e-line. Accordingly, even when the refractive indexes at the e-line are the same, because of the wavelength dependence of refractive index, it rarely happens that refractive indexes are in complete agreement at all the wavelengths. This may be a factor for the formation of interference fringes.

Another cause of interference fringes is nonuniformity in the thickness. Specifically, when a uniform coating having a completely uniform thickness is formed on the surface of the substrate, a uniform color is observed as the only interference color, and interference fringes with a rainbow-like color are not formed. Usually, when the thickness is reduced, the intervals between interference fringes and the line width are likely to be increased, whereby interference fringes are suppressed. This is because in the case of a thin film, the absolute thickness value is small, and the range of variation is also small accordingly. Reduced thickness has thus been believed to be desirable to suppress interference fringes. However, it is difficult to completely eliminate nonuniformity in the thickness, i.e., variation in the thickness, even when the coating method is devised. Further, nonuniformity is also caused due to the shape of the substrate, such as a lens, or the surface condition thereof Accordingly, even when the thickness is reduced, variation in the thickness cannot be completely eliminated, and this may be a factor for the formation of interference fringes.

Still another cause of interference fringes, especially of conspicuously observable interference fringes, is the light source. Under sunlight or like light containing light of various wavelengths at the same level of intensity, interference fringes are extremely difficult to observe. On the contrary, in the case of a three band fluorescent lamp or like light source in which the intensity of light is high at certain wavelengths, interference fringes are remarkably apparent. This is because light at three wavelengths (usually blue, green, and red) undergoes light interference due to the hard coating (thin film) on the substrate, and intensities are mutually increased or decreased, whereby the color balance of the light source is lost, and certain colors are strongly observed. Three band fluorescent lamps are often used for energy saving, and are widely used in ordinary households or offices. From the above point of view, the present inventors examined suppression of the formation of interference fringes.

FIG. 1 shows the spectral distribution $S(\lambda)$ of the three band fluorescent lamp F10. In the case of incident light having this spectral distribution $S(\lambda)$, when the balance of light at three wavelengths (three primary colors), i.e., the balance among three colors, is lost, various colors are developed, which causes interference fringes. In the case of incident light having the spectral distribution of artificial sunlight D65 light source, because the artificial sunlight D65 contains light of various wavelengths (colors), it hardly happens that certain colors are developed. Thus, interference fringes are hardly observed.

Figure 2:
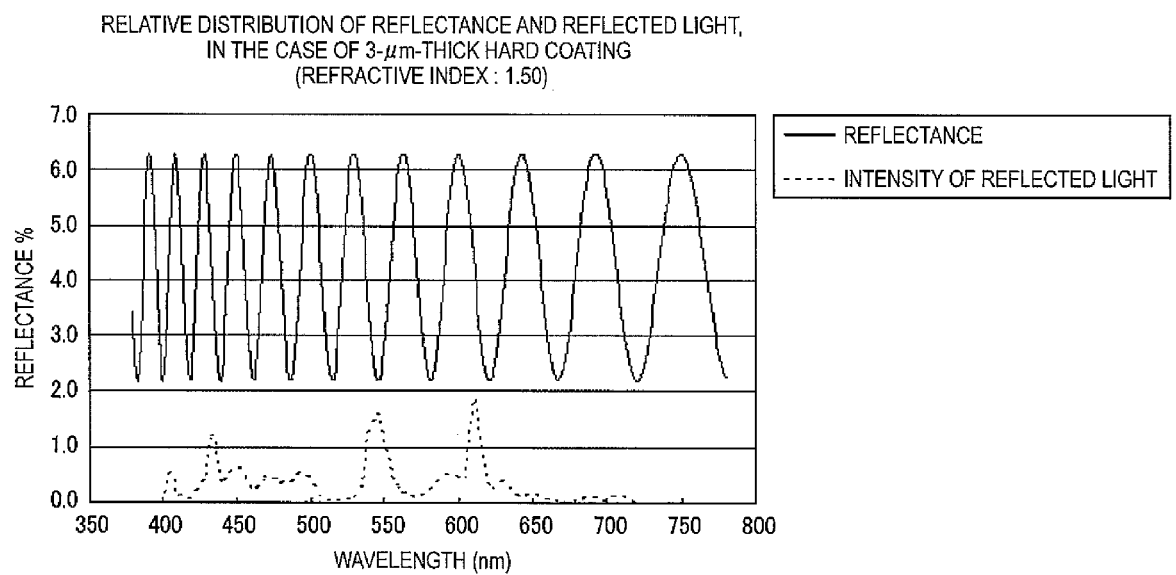
FIG. 2 shows an example of the distribution reflectance where interference fringes appear.

FIG. 2 shows an example of the case where interference fringes are present. FIG. 2 indicates, with a solid line in the wavelength space, the reflectance (reflection coefficient, calculated value) $R(\lambda)$ of a lens comprising a lens substrate with a refractive index 1.67 and a hard coating layer with a refractive index of 1.50 formed thereon to a thickness of 3 μm. The reflectance $R(\lambda)$ line waves with gentle curves. Accordingly, as indicated with a dashed line, the reflectance intensity distribution of reflected light is influenced by the reflectance $R(\lambda)$ at each wavelength, and the peak of green near 550 nm in the spectral distribution $S(\lambda)$ of the light source greatly decreases, whereby the balance of light of the three band fluorescent lamp at three wavelengths (blue, green, and red) is lost. As a result, the color of the reflected light is different from the original color of the light source. In addition, when the thickness of the hard coating layer changes, the wave of reflectance $R(\lambda)$ varies from side to side, and the peaks of reflected light at three wavelengths (blue, green, and red) each repeatedly increase and decrease, resulting in interference fringes having a rainbow color.

Figure 3:
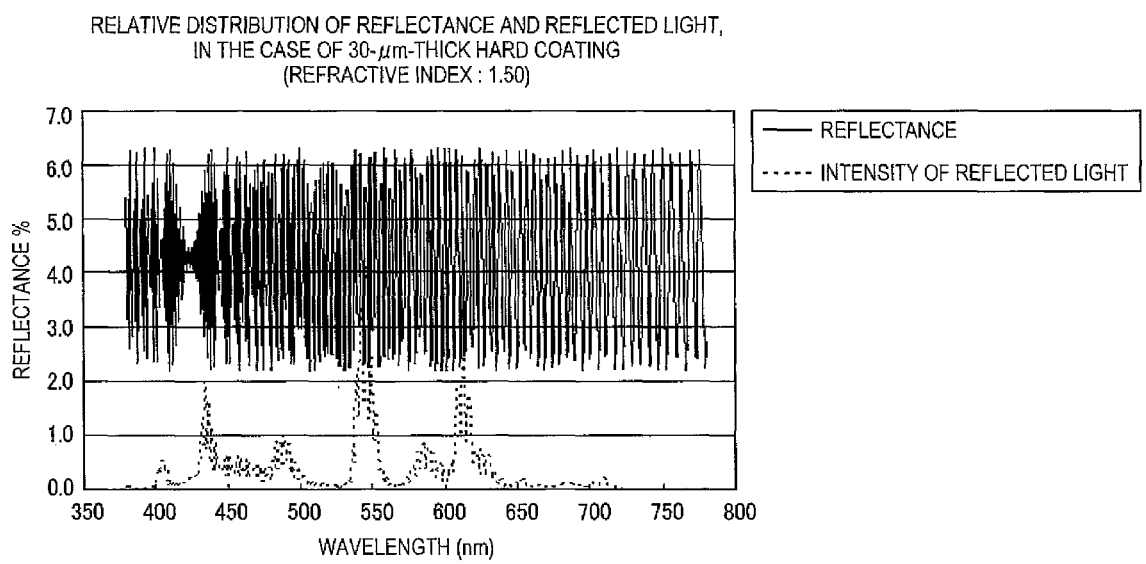
FIG. 3 shows an example of the distribution reflectance where no interference fringes appear.

FIG. 3 shows an example of the case where the period of reflectance $R(\lambda)$ in the wavelength space is reduced, and the oscillation frequency is increased, thereby suppressing the formation of interference fringes. FIG. 3 indicates, with a solid line in the wavelength space, the reflectance (calculated value) $R(\lambda)$ of a lens comprising a lens substrate with a refractive index 1.67 and a hard coating layer with a refractive index of 1.50 formed thereon to a thickness of 30 μm. The period of reflectance $R(\lambda)$ is small, while the oscillation frequency is high. Accordingly, the wavelength distribution of reflection intensity of the reflected light in the case of using a three band fluorescent lamp maintains almost the same shape as that of the original relative distribution $S(\lambda)$ of the light source, as indicated with a dashed line. This gives a repetition of small waves with a reflectance $R(\lambda)$ period of about some nanometers in the visible light region (380 to 780 nm). Accordingly, the relative intensity distribution of the reflected light has almost the same shape as that of the original relative distribution $S(\lambda)$ of the light source. Moreover, even when the thickness of the hard coating layer changes to some extent, whereby the wave form of reflectance also changes, because the period of reflectance $R(\lambda)$ in the wavelength space of the intensity distribution (spectrum) is extremely short, the intensity distribution of the reflected light maintains the same shape as that of the original intensity distribution $S(\lambda)$ of the light source.

It accordingly turns out that when the period of reflectance $R(\lambda)$ of the hard coating layer in the wavelength space is short, even in the case where the thickness of the hard coating layer changes, the color of the reflected light does not change, and such a color is close to the color of the light source. This indicates that even when the thickness changes to some extent, it is not likely to happen that certain colors are conspicuous. Interference fringes thus are hardly formed.

Figure 4:
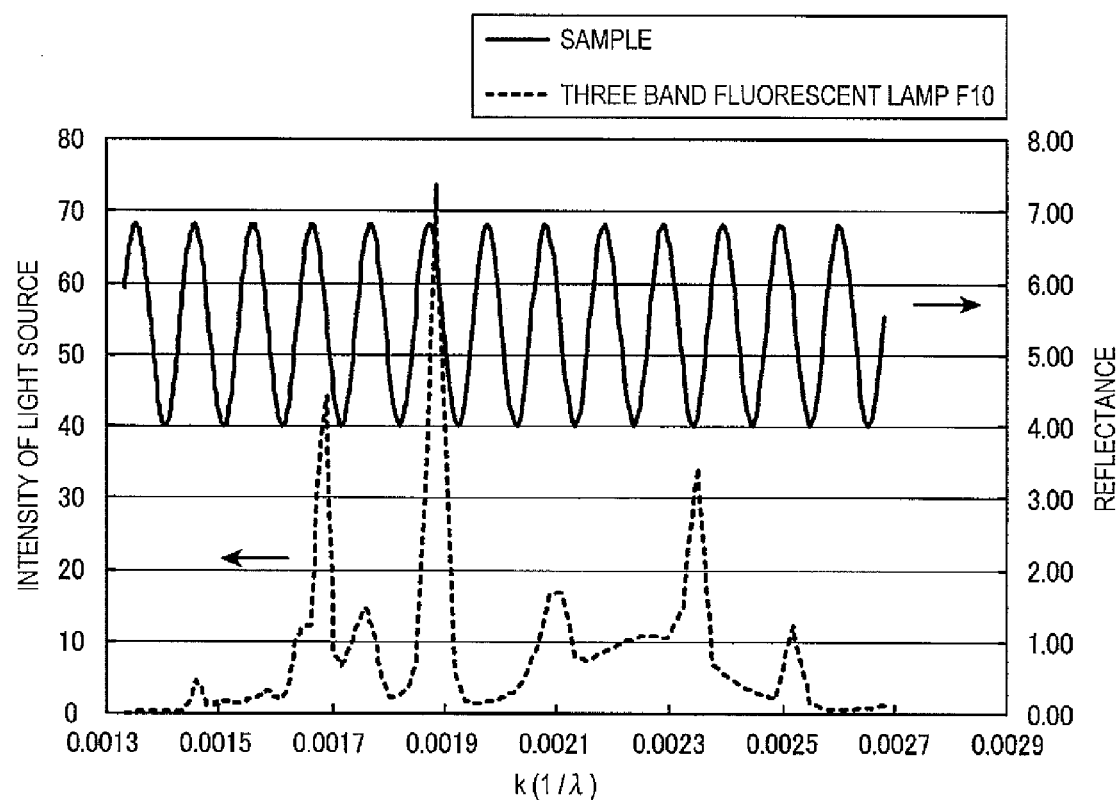
FIG. 4 shows reflectance and the distribution of light source in the k-space.

FIG. 4 shows the reflectance $R(k)$ of the hard coating layer $(=R(1/\lambda))$ and the spectral distribution $S(k)$ of the light source $(=S(1/\lambda))$ in the wavenumber space (1/λ-space, k-space). The spectral distribution $S(k)$ is the spectral distribution of the above-mentioned three band fluorescent lamp F10, and the reflectance $R(k)$ merely shows a trend. Generally, when a permeable (light-transmissive) film, such as a hard coating layer, is formed on the surface of an optical substrate, the reflectance is expressed by the following formula:

$$R = A + B \cos(2\pi nT/\lambda) \quad (1)$$

wherein A and B are proportionality constants, n is refractive index, T is thickness, and λ is wavelength. Accordingly, as expressed in the k-space (wavenumber space), the reflectance $R(k)$ oscillates at a constant frequency.

Moreover, with respect to thickness T and adjacent peak wavelengths (valley wavelength) λ1 and λ2, the following formula is known:

$$T = \lambda 1 \cdot \lambda 2 / 2 \cdot n1 \cdot |\lambda 1 - \lambda 2| \quad (2)$$

wherein n1 is the refractive index of a thin layer (hard coating layer). The formula is expanded under the following condition to give the formula (3).

λ1 > λ2

$$(1/\lambda 2 - 1/\lambda 1) = 1/(2 \cdot n1 \cdot T) \quad (3)$$

Accordingly, in the k-space, when the reflectance $R(k)$ of the functional layer laminated to the hard coating layer or a like substrate oscillates so minutely that no correlation is recognized with, the spectral distribution (spectrum) $S(k)$ of the incident light (light source), the correlation between the spectrum of the reflected light and the spectrum of the incident light can be increased. That is, when the period Pk of reflectance $R(k)$ of the functional layer is made sufficiently small relative to the period of or the change in the spectral distribution (spectrum) $S(k)$ of the incident light (light source), the correlation between the spectrum of the reflected light and the spectrum of the incident light can be increased. When the correlation between the spectrum of the reflected light and the spectrum $S(k)$ of the incident light is increased, it is possible to suppress the development of certain colors, whereby the formation of interference fringes can be suppressed.

Hereinafter, assuming a model including a substrate and a transparent functional layer laminated thereon, the reflectance $R(\lambda)$ and specific color coordinates of the reflected light are determined, and, from the color difference in the obtained color coordinates, the presence of interference fringes is evaluated. Further, the degree of human perception of interference fringes is evaluated to define the range (upper limit) of the period Pk of reflectance R(k) of the functional layer.

Simulation Regarding Recognition of Interference Fringes

Figure 5:
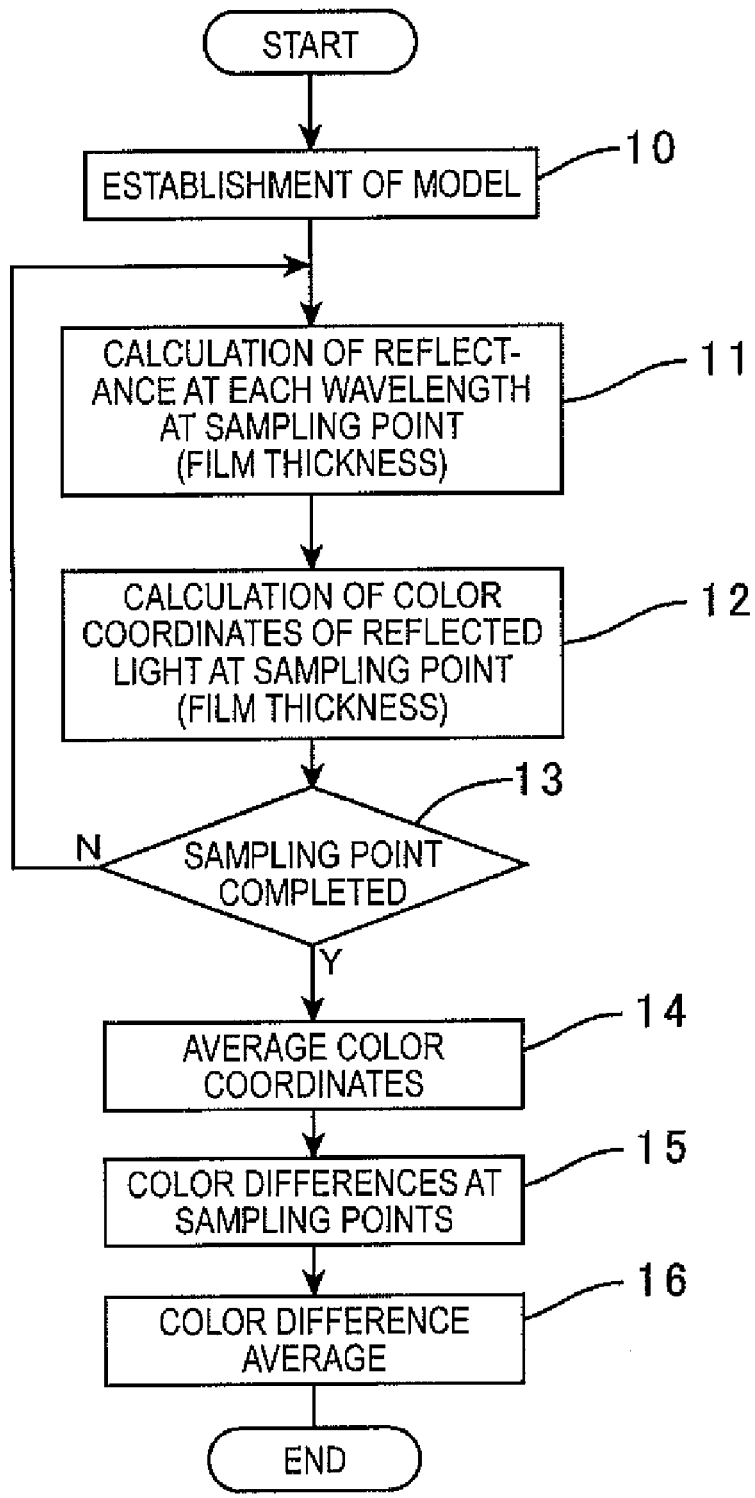
FIG. 5 is a flow chart schematically showing the process of simulation to evaluate the formation of interference fringes.
Figures 6, 7:
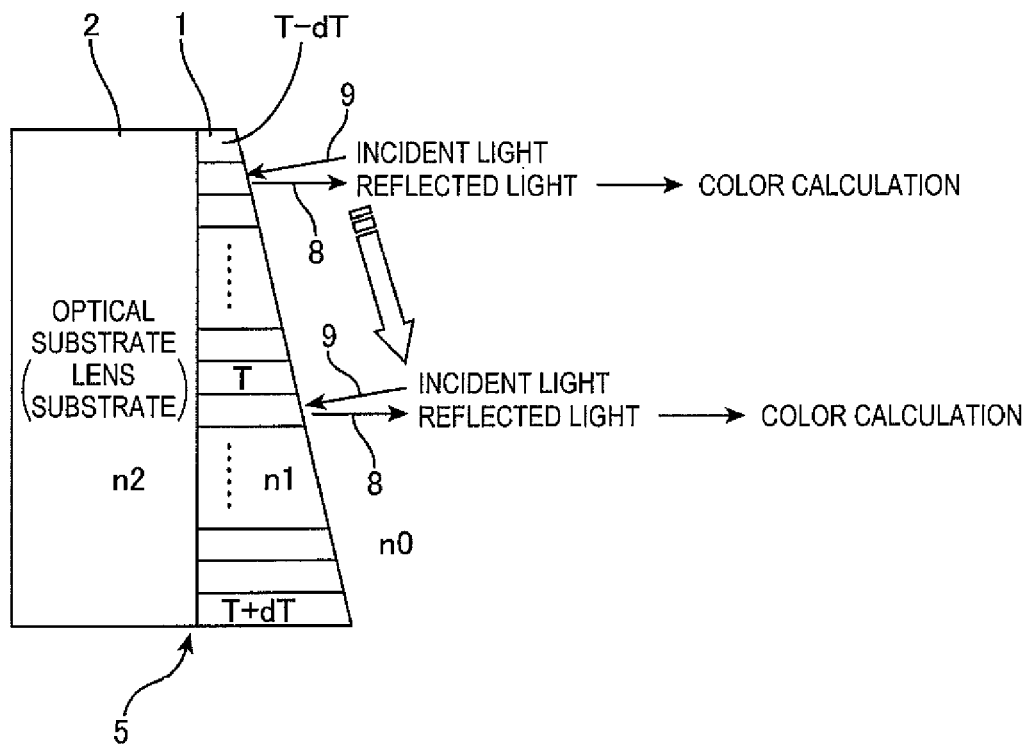
FIG. 6 shows a simulation model.
FIG. 7 shows reference data to evaluate color difference averages obtained by simulation.

FIG. 5 schematically shows a process of simulation regarding recognition of interference fringes. In step 10, a model (parameters) of an optical article 5 as shown in FIG. 6, such as a lens, is established. Typical examples of parameters include the refractive index n2 of an optical substrate 2, the thickness T of a hard coating layer or like transparent functional layer 1, the refractive index n1 of a functional layer 1, the thickness nonuniformity (thickness difference) dT in the functional layer 1, and the spectral distribution $S(\lambda)$ of a light source 9. The functional layer 1 is permeable (light-transmissive) in the visible light region. Further, the refractive index n1 of the functional layer 1 is constant, and is not changed in the thickness direction. An example of the wavelength distribution of a light source is the wavelength distribution of a typical fluorescent lamp specified in JIS Z 8719. Among several kinds of wavelength distributions, for the purpose of further emphasizing interference fringes, the relative spectral distribution according to the specification of the three band fluorescent lamp F10 can be used. In order to create interference fringes, the thickness difference dT of the functional layer 1 is necessary. For example, in the case of dip coating, a thickness difference dT of about ±20% or 30% of the central thickness T is preferably established.

Subsequently, in step 11, within the range of thickness T±dT, an adequate number of sampling points having different thicknesses are established, and the reflectance at each sampling point at the wavelengths in the visible light region is calculated every appropriate wavelength. For example, in the wavelength region of 380 to 780 nm, the reflectance is calculated every 1 nm (in 1 nm increments). Sampling points are established at 50 points up and 50 points down around the thickness T, giving 101 points in total.

In step 12, the reflectance at each wavelength is calculated. Also, from the spectral distribution $S(\lambda)$ of the light source (incident light) 9, color coordinates C(i) of the reflected light 8 are calculated. As the color coordinates, the coordinates in the color space of L*a*b* color system can be used, for example. In step 13, the above operation is repeated for all the sampling points, and, within the range of thickness T±dT, the color coordinates of the 101 points C(1) to C(101) are determined.

In step 14, the average color coordinates Cav are calculated from the above-determined 101 points' color coordinates C(i). In step 15, the color difference $\Delta E^*_{ab}(i)$ from the average color coordinates Cav is calculated for each color coordinates C(i) using the L*a*b* color system. Further, in step 16, the average dEav of the color differences $\Delta E^*_{ab}(i)$ was obtained as an evaluation value for evaluating the degree of interference fringes at the central thickness T. When the same color exists in many points in the plane of the optical article 5, the average dEav is small, while the average dEav is large when many colors exist in the plane.

Evaluation Method

For the evaluation of color difference average dEav, the correlation table of FIG. 7 showing the correlation between color difference $\Delta E$ on the NBS scale and human visual sensation was employed as the primary criterion. The NBS scale is a standard proposed by National Bureau of Standards. When the color difference $\Delta E$ on the NBS scale is not more than 1.5, the color difference is only slightly perceptible. Therefore, when the average dEav obtained from the above simulation is not more than 1.5, even in the case where interference fringes appear on the surface of the optical article 5, such interference fringes are expected to be only slightly perceptible to humans. Accordingly, such a result can be recognized as significant (category 1).

When the color difference $\Delta E$ is not more than 1.0, the difference is believed to be indistinguishable to humans, unless the colors are adjacent. Therefore, when the average dEav obtained from the above simulation is not more than 1.0, even in the case where interference fringes appear on the surface of the optical article 5, such interference fringes are expected to be only slightly perceptible to humans, with a smaller degree of color difference perception. Accordingly, such a result can be recognized as even more significant (category 2).

When the color difference $\Delta E$ on the NES scale is not more than 0.5, the color difference is only barely perceptible. Therefore, when the average dEav obtained from the above simulation is not more than 0.5, even in the case where interference fringes appear on the surface of the optical article 5, such interference fringes are expected to be only barely perceptible to humans. Accordingly, such a result can be recognized as even more significant (category 3).

The minimum value that allows human color identification is 0.2, and this is sometimes called the Least Perceptible Difference (LPD). Therefore, when the average dEav obtained from the above simulation is not more than 0.2, even in the case where interference fringes appear on the surface of the optical article 5, such interference fringes are expected to be imperceptible to humans. Accordingly, such a result can be recognized as even more significant (category 5).

Even in the case where the color difference $\Delta E$ does not reach to the Least Perceptible Difference (LPD), when the color difference $\Delta E$ is not more than 0.3, such color difference is substantially difficult to distinguish by human eyes. Therefore, when the average dEav obtained from the above simulation is not more than 0.3, even in the case where interference fringes appear on the surface of the optical article 5, such interference fringes are expected almost imperceptible to humans. Accordingly, such a result can be recognized as significant (category 4).

Accordingly, the ranges shown in FIG. 7 are further divided to evaluate the averages dEav obtained by the simulation. Specifically, when a model (optical article) 5 has a color difference average dEav of more than 1.5, such a result does not have significance. A model (optical article) 5 having a color difference average dEav of not more than 1.5 results in interference fringes that are only slightly perceptible, and is thus preferable, and a model (optical article) 5 having a color difference average dEav of not more than 1.0 results in interference fringes with a smaller degree of slight perception, and thus is more preferable. A model (optical article) 5 having a color difference average dEav of not more than 0.5 results in interference fringes that are barely perceptible, and thus is preferable, and a model (optical article) 5 having a color difference average dEav of not more than 0.3 results in almost no interference fringes perceptible, and thus is more preferable. A model (optical article) 5 having a color difference average dEav of not more than 0.2 may result in interference fringes that are, if any, imperceptible to human eyes, and thus is most preferable.

Calculation of Reflectance, Step 11

The following is an example of the calculation method for the reflectance and reflected light at each sampling point (thickness). The phase difference $2\delta$ between the wave reflected from the surface of the functional layer 1 and the wave reflected traveling back and forth to the functional layer 1 is expressed by the following formula:

$$2\delta = (4\pi/\lambda) n1 T \cos \phi \quad (4)$$

wherein n1 is the refractive index of the functional layer 1, T is the thickness of the functional layer 1, and φ is the incidence angle of a ray.

Reflection coefficient R is expressed by the following formula:

$$R(\lambda) = (r1 + r2 \exp(-2i\delta))/(1 + r1r2 \exp(-2i\delta)) \quad (5)$$

wherein r1 and r2 are Fresnel coefficients, which are expressed, in the case of perpendicular incidence, by the following formula:

$$r1 = (n0 - n1)/(n0 + n1)$$

$$r2 = (n1 - n2)/(n1 + n2) \quad (6)$$

wherein n2 is the refractive index of the substrate 2, and n0 is the refractive index of air.

Calculation of Reflected Light, Step 12

Figure 8:
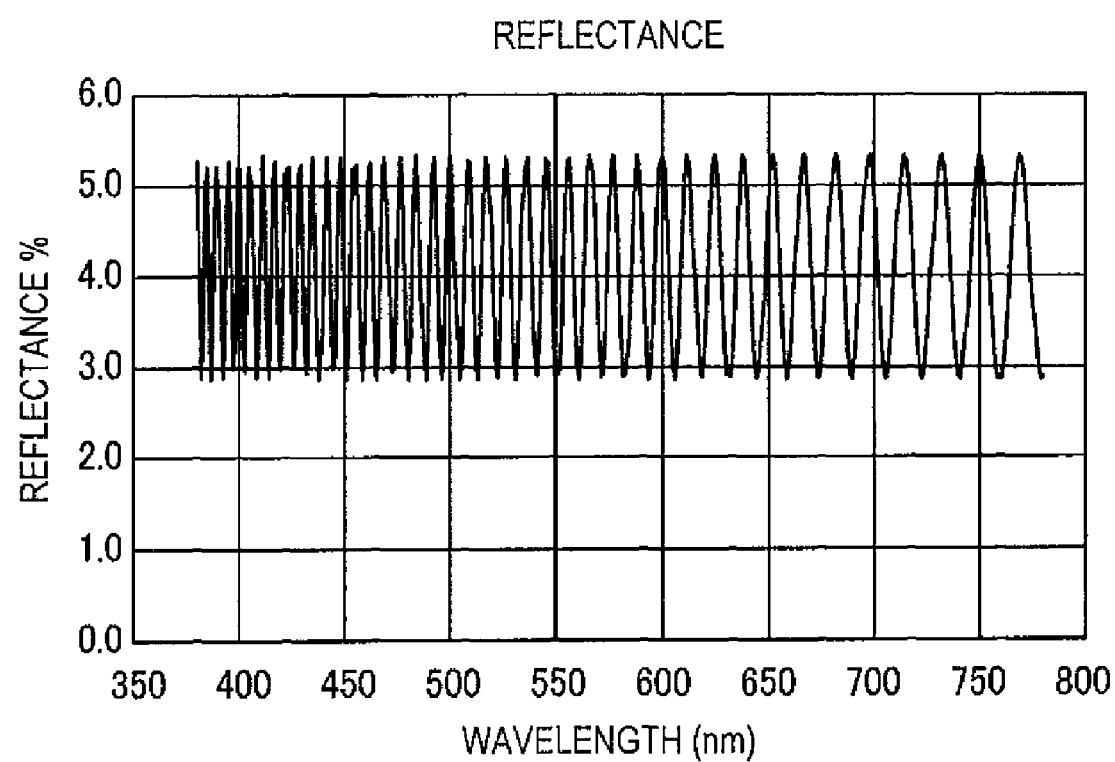
FIG. 8 shows an example of the distribution of reflection coefficient.

From the formula (5), the reflectance is calculated every 1 nm in the visible wavelength range of 380 to 780 nm. FIG. 8 shows the reflectance R(λ) determined using a model 5 in which the refractive index n2 of the substrate 2 is 1.60, the refractive index n1 of the functional layer 1 is 1.50, and the thickness T of the functional layer 1 is 10 μm.

From the values of reflectance R(λ), tristimulus values (XYZ) are calculated using the formula below. The spectral distribution S(λ) of the light source 9 used in this case is the distribution of the three band fluorescent lamp F10 shown in FIG. 1.

$$X = K\Sigma_{380}^{780} S(\lambda) \cdot \bar{x}(\lambda) \cdot R(\lambda) d\lambda$$

$$Y = K\Sigma_{380}^{780} S(\lambda) \cdot \bar{y}(\lambda) \cdot R(\lambda) d\lambda$$

$$Z = K\Sigma_{360}^{780} S(\lambda) \cdot \bar{z}(80) \cdot R(\lambda) d\lambda \quad (7)$$

In the above equations, $K = 100/\Sigma_{380}^{780} S(\lambda) \cdot \bar{y}(\lambda) d\lambda$, and $\bar{x}(\lambda)$, $\bar{y}(\lambda)$, and $\bar{z}(\lambda)$ are color-matching functions in the XYZ color system.

The CIEXYZ in the CIE color coordinates obtained from the formula (7) is (4.00, 4.13, 3.38).

Further, from XYZ, the color coordinates (L*, a*, b*) of the L*a*b* color system are calculated using the following formula:

$$L^* = 116(Y/Yn)^{1/3} - 16$$

wherein $Yn = K\Sigma_{380}^{780} S(\lambda) \cdot \bar{y}(\lambda) \cdot 1 d\lambda$ $$K = 100/\Sigma_{380}^{780} S(\lambda) \cdot \bar{y}(\lambda) d\lambda,$$

$$a^* = 500 [(X/Xn)^{1/3} - (Y/Yn)^{1/3}]$$

$$b^* = 200 [(Y/Yn)^{1/3} - (Z/Zn)^{1/3}]$$

wherein $Xn = K\Sigma_{380}^{780} S(\lambda) \cdot \bar{x}(\lambda) \cdot 1 d\lambda$, $$Zn = K\Sigma_{380}^{780} S(\lambda) \cdot \bar{z}(\lambda) \cdot 1 d\lambda \quad (8)$$

Color coordinates of the L*a*b* color system are (24.11, 0.21, 0.11).

Iterative Calculation for Sampling Points, Step 13

In this model, a thickness difference dT of ±30% of the 10-μm thickness T is established. Accordingly, at a thicknesses of 7 to 13 μm, 50 film-thickness sampling points are established on the minus side of the thickness, and another 50 film-thickness sampling points are established on the plus side of the thickness. The above steps 11 and 12 are repeated for each point. For example, calculations of steps 11 and 12 are performed at a thickness of 7.00 μm, calculations of steps 11 and 12 are performed at a thickness of 7.06 μm, and calculations of steps 11 and 12 are performed at a thickness of 7.12 μm. In this manner, 101 sets of color coordinates (L*, a*, b*) are obtained.

Calculation of Average, Step 14

From the 101 sets of color coordinates, the average (center) color is calculated. Specifically, L*, a*, and b* are each averaged. In the case of this model, the average is (23.98, 0.0, 0.0).

Calculation of Color Difference, Step 15

The color difference between the L*, a*, b* average and the color coordinates of each of the sampling points (101 points) is calculated by the following formula.

$$\Delta E^* = [(\Delta L^*)^2 + (\Delta a^*)^2 + (\Delta b^*)^2]^{1/2} \quad (9)$$

Calculation of Color Difference Average, Step 16

The average dEav of color differences ΔE* of the sampling points is determined. In the case of this mode, the color difference average dEav was 0.40. Accordingly, interference fringes are only barely perceptible, and thus an optical article 5 showing almost no interference fringes can be provided.

The color difference average dEav changes with a change in the parameters of the model 5. Among the parameters, the average dEav is not so susceptible to the thickness nonuniformity (thickness difference) dT, and there is no large difference within the range of ±5 to 30%.

For example, in the above simulation, when only the thickness tolerance is changed, the results are as follows.

Model with a Film-Thickness Tolerance of ±5%
  Average of L*, a*, b*: (23.98, 0.0, 0.0), dEav: 0.27
Model with a Film-Thickness Tolerance of ±10%
  Average of L*, a*, b*: (23.98, 0.0, 0.0), dEav: 0.31
Model with a Film-Thickness Tolerance of ±15%
  Average of L*, a*, b*: (23.99, 0.0, 0.0), dEav: 0.33
Model with a Film-Thickness Tolerance of ±20%
  Average of L*, a*, b*: (23.99, 0.0, 0.0), dEav: 0.33
Model with a Film-Thickness Tolerance of ±25%
  Average of L*, a*, b*: (23.99, 0.0, 0.0), dEav: 0.36
Model with a Film-Thickness Tolerance of ±30%
  Average of L*, a*, b*: (23.98, 0.0, 0.0), dEav: 0.40

Comparison Between Examples and Simulation Results

Several optical articles of Examples and Comparative Examples were produced, and the visibility of interference fringes was compared with the results of evaluation using the simulation-based averages dEav.

Preparation of Coating Liquid for Forming Hard Coating Layer

First, 4.46 parts by weight of acid anhydride curing agent (trade name: liquid curing agent (C2) (Arakawa Chemical Industries)) was mixed with 20 parts by weight of epoxy resin-silica hybrid (trade name: Compoceran E102 (Arakawa Chemical Industries)), and stirred to give a liquid mixture (coating liquid).

Production of Optical Articles of Examples and Comparative Examples

The above-obtained coating liquid was applied onto a board 2 using a spin coater to a predetermined thickness, thereby forming a hard coating layer (functional layer) 1. Optical articles (spectacle lenses) 5 of Examples (E1 to E4) and Comparative Example (R1 and R2) were thus produced. Used as boards (substrates) 2, to which coating was applied, were Seiko Super Sovereign boards with a refractive index of 1.67 (E1, E2, and R1) and Seiko Prestige boards with a refractive index of 1.74 (E3, E4, and R2). Subsequently, the coated lens substrates were calcined at 125° C. for 2 hours.

Evaluation 1

Using a three band fluorescent lamp as a light source, interference fringes on the above-obtained spectacle lenses 5 were visually observed. The criteria are as follows.

Excellent: Interference fringes inappreciable
Good: Interference fringes slightly appreciable
Fair: Interference fringes appreciable
Poor: Interference fringes remarkably appreciable Evaluation 2

The reflectance of each of the above-obtained spectacle lenses 5 was measured by a spectral reflectometer at wavelengths of 380 to 780 nm, and, as in the simulation, the reflected color Lab* of the light source F10 was calculated from the measured reflectance. This operation was performed at random ten measurement points from the upper part to the lower part on the board, and the average thereof was determined. The color differences (ΔE) at the ten points were calculated from the average, and the average Eab of the color differences was calculated.

FIG. 9 shows the results thereof, together with the period Pk of reflectance R(k) and the color difference average dEav obtained by simulation. As shown in the figure, the results of evaluation based on the color difference average dEav obtained by simulation are in close agreement with the results of evaluation of the products of Examples E1 to E4 and Comparative Examples R1 and R2.

Further, Examples E1 and E2 and Example E3 and E4 are compared with Comparative Example R1 and Comparative Example R2, respectively, in which the difference dn between the refractive index n1 of the hard coating layer 1 and the refractive index n2 of the substrate 2 is the same. As a result, the lenses 5 of Examples E1 and E2 in which the thickness of the hard coating layer 1 is larger and the period Pk of reflectance R(k) is shorter exhibit no or imperceptible interference fringes.

Further, the lenses 5 of Examples E3 and E4 having a refractive index difference dn as large as 0.19 also exhibit no or imperceptible interference fringes, because of the shortened period Pk of reflectance R(k) of the hard coating layer 1.

Maximum Period

The above indicates that when the period Pk of reflectance R(k) of the functional layer 1 laminated on the hard coating layer or a like substrate 2 is shortened (reduced), a lens 5 exhibiting imperceptible interference fringes can be provided even in the cases where there is a difference in refractive index between the substrate 2 and the functional layer 1, the refractive index n1 of the functional layer 1 is constant, and further the thickness of the functional layer 1 is non-uniform, has tolerance, or varies. Accordingly, in order to determine the minimum thickness that offers such effects, several models were simulated to determine the relation between the period Pk of reflectance R(k) and the color difference average dEav. The models were selected so that the refractive index n2 of the substrate 2 was within the range of 1.50 to 1.90, the refractive index n1 of the functional layer 1 was within the range of 1.50 to 1.90, and the refractive index difference at the boundary of the substrate 2 and the functional layer 1 was 0.06 to 0.40.

FIG. 10 shows, among such models, models D1 to D10 that at least satisfy the above category 1, i.e., models having period Pk that gives a color difference average dEav of not more than 1.5. FIG. 11 shows reference models RD1 to RD5 having period Pk that gives a color difference average dEav of not less than 1.5. As compared with the reference models RD1 to RD5, the models D1 to D10 all satisfy the requirements of the category 1 that the period Pk be not more than $3.66 \times 10^{-5}$ $nm^{-1}$ and that the color difference average dEav be not more than 1.5. Accordingly, the maximum period Pk1 of reflectance R(k) of the functional layer 1 for at least satisfying the category 1 can be set at $3.66 \times 10^{-5}$ $nm^{-1}$.

FIG. 12 shows models D11 to D20 that at least satisfy the above category 2, i.e., models having period Pk that gives a color difference average dEav of not more than 1.0. Meanwhile, FIG. 13 shows reference models RD11 to RD14 having period Pk that gives a color difference average dEav of not less than 1.0. As compared with the reference models RD11 to RD14, the models D11 to D20 all satisfy the requirements of the category 2 that the period Pk be not more than $3.03 \times 10^{-5}$ $nm^{-1}$ and that the color difference average dEav be not more than 1.0. Accordingly, the maximum period Pk2 of reflectance R(k) of the functional layer 1 for at least satisfying the category 2 can be set at $3.03 \times 10^{-5}$ $nm^{-1}$.

FIG. 14 shows models D21 to D30 that at least satisfy the above category 3, i.e., models having period Pk that gives a color difference average dEav of not more than 0.5. Referring to the models D11, D16, D18, and D19 shown in FIG. 12, the models D21 to D30 all satisfy the requirements of the category 3 that the period Pk be not more than $2.08 \times 10^{-5}$ $nm^{-1}$ and that the color difference average dEav be not more than 0.5. Accordingly, the maximum period Pk3 of reflectance R(k) of the functional layer 1 for at least satisfying the category 3 can be set at $2.08 \times 10^{-5}$ $nm^{-1}$.

FIG. 15 shows models D31 to D40 that at least satisfy the above category 4, i.e., models having period Pk that gives a color difference average dEav of not more than 0.3. Referring to the models D26, D28, and D29 shown in FIG. 14, the models D31 to D40 all satisfy the requirements of the category 4 that the period Pk be not more than $1.59 \times 10^{-5}$ $nm^{-1}$ and that the color difference average dEav be not more than 0.3. Accordingly, the maximum period Pk4 of reflectance R(k) of the functional layer 1 for at least satisfying the category 4 can be set at $1.59 \times 10^{-5}$ $nm^{-1}$.

FIG. 16 shows models D41 to D50 that at least satisfy the above category 5, i.e., models having period Pk that gives a color difference average dEav of not more than 0.2. Referring to the models D36, D38, and D39 shown in FIG. 15, the models D41 to D50 all satisfy the requirements of the category 5 that the period Pk be not more than $1.39 \times 10^{-5}$ $nm^{-1}$ and that the color difference average dEav be not more than 0.2. Accordingly, the maximum period Pk5 of reflectance R(k) of the functional layer 1 for at least satisfying the category 5 can be set at $1.39 \times 10^{-5}$ $nm^{-1}$.

It is accordingly turned out that in order for interference fringes to be absent or imperceptible to humans, with respect to the period Pk of reflectance R(k) of the functional layer 1, a shorter (smaller) period is desirable. However, human identification is impossible once the color difference is in the category 5, so reduction of the period Pk of reflectance R(k) to further reduce the color difference may result in unnecessary increase in the thickness of the functional layer 1. Such a thick functional layer 1 is unnecessary for suppressing the formation of interference fringes. Meanwhile, excessive increase in the thickness of the functional layer 1 is a waste of materials, and in addition, cracks are expected in the production process due to the volume change caused by drying after the film formation, etc. Further, although thickening of the functional layer 1 reduces the chance of interference fringes even when the thickness varies, the surface accuracy of the functional layer is remarkably reduced. This is undesirable for the performance of an optical article or an optical element.

The thickness T of the functional layer 1 is preferably not more than 100 μm, where cracks are less likely to occur due to drying of a formed film. When the thickness is in such a range, the surface accuracy can be easily secured. For example, when the functional layer 1 has a refractive index n1 of 1.9, the period Pk of reflectance R(k) at a thickness T of 100 μm is $2.63 \times 10^{-6}$. Such a period Pk can be adopted as the minimum period.

Further, when the thickness T of the functional layer 1 is not more than 50 μm, the surface accuracy can be Secured more easily. For example, when functional layer 1 has a refractive index n1 of 1.9, the period Pk of reflectance R(k) at a thickness T of 50 μm is $5.26 \times 10^{-6}$. Such a period Pk can be adopted as the minimum period. Range of the period of reflectance From the above results, when the period Pk ($nm^{-2}$) of reflectance of the functional layer 1 in the k-space is not more than $3.66 \times 10^{-5}$, the color difference at least falls under the category 1. Accordingly, the color difference due to interference fringes in only slightly perceptible. That is, in the case where the period Pk of reflectance R(k) ($nm^{-1}$) exceeds $3.66 \times 10^{-5}$, the color difference due to interference fringes may be appreciable, and such a case is thus undesirable. The wavenumber k is the reciprocal of wavelength (1/λ).

Further, when the period Pk of reflectance R(k) of the functional layer 1 is not more than $3.03 \times 10^{-5}$, the color difference at least falls under the category 2. Accordingly, although color difference due to interference fringes may be slightly perceptible, the degree thereof is smaller.

Further, when the period Pk of reflectance R(k) of the functional layer 1 is not more than $2.08 \times 10^{-5}$, the color difference at least falls under the category 3. Accordingly, although color difference due to interference fringes may be barely perceptible, the possibility is limited.

Further, when the period Pk of reflectance R(k) of the functional layer 1 is not more than $1.59 \times 10^{-5}$, the color difference at least falls under the category 4. Accordingly, although color difference due to interference fringes may be barely perceptible, the degree thereof is even smaller.

Further, when the period Pk of reflectance R(k) of the functional layer 1 is not more than $1.39 \times 10^{-5}$, the color difference at least falls under the category 5. Accordingly, almost no color difference due to interference fringes is perceptible.

The minimum period Pk of reflectance R(k) of the functional layer 1 is not defined. In consideration of the thickness of the functional layer 1, the period Pk is preferably not less than $2.63 \times 10^{-6}$, and more preferably not less than $5.26 \times 10^{-6}$.

Thus, in the above optical article 5, the period Pk of reflectance R(k) of the functional layer 1, such as a hard coating, is reduced or shortened, thereby suppressing various changes in the spectrum S(k) of the light source 9, and the formation of interference fringes is thus suppressed. For example, when the period Pk of reflectance R(k) of the functional layer 1 is reduced far shorter than the period included in the spectrum S(k) of the light source 9 or the period that characterizes S(k), the spectrum of the reflected light can be matched or approximated to the spectrum of the light source 9.

Accordingly, when the functional layer, such as a hard coating layer, which is a film with the above reflectance and having a constant refractive index that does not change in the thickness direction is formed on an optical substrate, such as a lens, even in the case where the refractive index of the functional layer is different from the refractive index of the optical substrate, the formation of interference fringes can be suppressed. Accordingly, even when the optical substrate, such as a lens substrate, is different, it is possible to achieve commonality of coating system among the hard coating layer laminated on the substrate, the primer layer explained below, the antireflection film further provided thereon, and the anti-fouling film (antifouling layer). Further, there is no need to design and construct a hard coating layer with a complicated specification having a refractive index that varies in the thickness direction. For this reason, regardless of the refractive index of the lens substrate or other optical substrates, only one production line is required for the hard coating layer or the like, and also only one kind of antireflection film is necessary. Accordingly, an extremely simple production line can be applied for various optical substrates to produce spectacle lenses and like optical articles. The production cost can thus be reduced.

In the above Examples, a hard coating layer is described as an example of the functional layer 1. However, the structure of the hard coating layer is not limited thereto. Examples of resins for forming the hard coating layer include acryl-based resin, melamine-based resin, urethane-based resin, epoxy-based resin, polyvinyl-acetal-based resin, amino-based resin, polyester-based resin, polyamide-based resin, vinyl-alcohol-based resin, styrene-based resin, silicon-based resin, and mixtures or copolymers thereof. The resin for forming the functional layer included in the invention is not limited insofar as a transparent coating can be formed, and may be any of general-purpose resins used as coating agents. However, in consideration of that the functional layer 1 mainly functions as a protective film, silicon-based resin, acryl-based resin, and urethane-based resin are preferably used for the hard coating layer, For a primer layer for imparting adhesion, urethane-based resin and polyester-based resin are preferably used. The hard coating layer is not limited to a monolayer, and may also have a multilayer structure.

The functional layer 1 is not limited to the hard coating layer. The functional layer 1 may also include at least one primer layer that is laminated between at least one hard coating layer and the optical substrate 2 and has a constant refractive index. Like the above-mentioned hard coating layer, when the period Pk of reflectance R(k) is shortened, the formation of interference fringes resulting from the primer layer can be suppressed. Accordingly, even when the optical substrate, such as a lens substrate, is different, which results in difference in refractive index between the substrate and the primer layer, the primer layer laminated on the substrate may have a constant refractive index.

The primer layer serves to secure the adhesion between the lens substrate 2 and the hard coating layer and/or improves the shock resistance that has been a defect of a high-refractive-index lens substrate. Examples of resins for forming the primer layer include acryl-based resin, melamine-based resin, urethane-based resin, epoxy-based resin, polyvinyl-acetal-based resin, amino-based resin, polyester-based resin, polyamide-based resin, vinyl-alcohol-based resin, styrene-based resin, silicon-based resin, and mixtures or copolymers thereof. For the primer layer for imparting adhesion, urethane-based resin and polyester-based resin are preferably used.

When the refractive index of the lens substrate is n2, the refractive index of the primer layer is n3, and the refractive index of the hard coating layer is n1, these refractive indexes preferably satisfy the following formula:

$$n2 \leq n3 \leq n1 \text{ or } n2 \geq n3 \geq n1 \tag{10}$$

When materials are selected to satisfy this relation, the difference between the maximum reflectance and the minimum reflectance can be reduced, and the resulting wave form of reflectance is more flat. Accordingly, interference fringes can be further suppressed. In a functional layer containing several layers having different refractive indexes, reflection may occur between the internal layers. The frequency characteristics of reflectance are thus complicated, giving a wider variety of factors for the formation of interference fringes.

However, when the above-disclosed thickness as the whole functional layer 1 is secured, the formation of interference fringes can be suppressed.

The method for forming a functional layer, such as a hard coating layer, on an optical substrate, such as a plastic lens, may be any of the publicly known coating methods. Spin coating is preferable to make the thickness more uniform. On the other hand, in order to apply coating to a plurality of lenses at once placing prime importance on productivity, dipping is preferable.

Further, an inorganic antireflection film or an organic antireflection film may also be formed on the functional layer 1. An antireflection layer is a thin layer that is formed on the hard coating layer if necessary. The antireflection ion layer may be formed, for example, by alternately laminating a low-refractive-index layer with a refractive index of 1.3 to 1.5 and a high-refractive-index layer with a refractive index of 1.8 to 2.3. The number of layers is preferably about five or seven.

Example of inorganic substances used for layers that form the antireflection layer include $SiO_2$, $SiO$, $ZrO_2$, $TiO_2$, $TiO$, $Ti_2O_3$, $Ti_2O_5$, $Al_2O_3$, $TaO_2$, $Ta_2O_5$, $NbO$, $Nb_2O_3$, $NbO_2$, $Nb_2O_5$, $CeO_2$, $MgO$, $Y_2O_3$, $SnO_2$, $MgF_2$, and $WO_3$. These inorganic substances are used singly, or alternatively, two or more kinds are used in mixture. An example of the antireflection layer is one having a $SiO_2$ layer as a low-refractive-index layer and a $ZrO_2$ layer as a high-refractive-index layer.

Examples of methods for forming the antireflection layer include dry methods, such as vacuum deposition, ion plating, and sputtering. As vacuum deposition, it is also possible to employ ion-beam-assisted deposition, in which an ion beam is applied simultaneously during vacuum evaporation.

The antireflection layer may also be formed using a wet method. For example, the layer may be formed by applying a coating composition for forming an antireflection layer, which contains silica-based particles having an inner cavity (hereinafter sometimes referred to as "hollow silica-based particles") and an organic silicon compound, in the same manner as in the formation of the hard coating layer and the primer layer. The reason for using hollow silica-based particles is as follows. The inner cavity thereof may contain a gas or solvent having a lower refractive index than that of silica, whereby the particles have reduced refractive index as compared with silica-based particles having no cavity. As a result, excellent antireflection effects can be imparted. Hollow silica-based particles can be produced by a method described in JP-A-2001-233611, but those having an average particle diameter of 1 to 150 nm and a refractive index of 1.16 to 1.39 are preferably used. The organic antireflection layer preferably has a thickness of 50 to 150 nm. When the thickness is larger or smaller than this range, sufficient antireflection effects may not be provided.

Further, a water-repellent film or a hydrophilic antifogging film (antifouling film) may also be formed on the antireflection film. The antifouling layer is a layer comprising a fluorine-containing organosilicon compound and is formed on the antireflection layer for the purpose of improving the water-repellent and oil-repellent properties of the optical article surface. Examples of fluorine-containing organosilicon compounds include fluorine-containing silane compounds described in JP-A-2005-301208 and JP-A-2006-126782, for example.

A fluorine-containing silane compound is preferably dissolved in an organic solvent to a prescribed concentration and used as a water-repellent processed liquid (coating composition for forming an antifouling layer). The antifouling layer can be formed by applying the water-repellent processed liquid (coating composition for forming an antifouling layer) onto the antireflection layer. The coating method therefor may be dipping, spin coating, or the like. In addition, it is also possible to charge the water-repellent processed liquid (coating composition for forming an antifouling layer) into metal pellets, and then form an antifouling layer using vacuum deposition or a like dry method.

The thickness of the antifouling layer is not limited, and is preferably 0.001 to 0.5 µm, and more preferably 0.001 to 0.03 µm. When the antifouling layer is too thin, this results in poor water-repellent and oil-repellent effects, while when the layer is too thick, the resulting surface is sticky, so both cases are undesirable. Further, when the thickness of the antifouling layer exceeds 0.03 µm, the antireflection effects may be impaired.

In the above embodiments, a spectacle lens comprising a coated plastic lens is mainly taken as an example of the optical article. The invention enables to provide a pair of spectacles comprising a spectacle lens made of plastic provided with a thick hard coating layer as above and a frame having mounted thereto such a spectacle lens. When such spectacles are exposed to the light of a fluorescent lamp in a room, an office, etc., interference fringes hardly appear on the surface of the lenses. Therefore, unsightly appearance can be prevented, and reflected glare and like problems can also be suppressed. Accordingly, spectacles with high commercial value can be provided.

The optical article is not limited to a spectacle lens. In an indoor environment, such as in a room, an office, or a factory, or in other places, the invention can be also applied to an optical article whose surface is exposed to a fluorescent lamp or like light having non-white spectral distribution. Examples thereof are televisions, computer displays, windows, and like systems that include an optical article with at least one side thereof facing to the outside and are used for seeing an image through the optical article.

The entire disclosure of Japanese Patent Application No: 2008-306048, filed Dec. 1, 2008 is expressly incorporated by reference herein.

What is claimed is:

1. An optical article comprising:
   an optical substrate, and
   a functional layer that is light-transmissive and is laminated to the surface of the optical substrate,
   the period Pk ($nm^{-1}$) of reflectance of the functional layer in the k-space being not more than $3.66 \times 10^{-5}$.

2. An optical article according to claim 1, wherein the period Pk of reflectance of the functional layer is not more than $3.03 \times 10^{-5}$.

3. An optical article according to claim 2, wherein the period Pk of reflectance of the functional layer is not more than $2.08 \times 10^{-5}$.

4. An optical article according to claim 3, wherein the period Pk of reflectance of the functional layer is not more than $1.59 \times 10^{-5}$.

5. An optical article according to claim 4, wherein the period Pk of reflectance of the functional layer is not more than $1.39 \times 10^{-5}$.

6. An optical article according to claim 1, wherein the period Pk of reflectance of the functional layer is not less than $2.63 \times 10^{-6}$.

7. An optical article according to claim 6, wherein the period Pk of reflectance of the functional layer is not less than $5.26 \times 10^{-6}$.

8. An optical article according to claim 1, wherein the functional layer includes a hard coating layer.

9. An optical article according to claim 8, wherein the functional layer includes a primer layer that is laminated between the hard coating layer and the optical substrate.

10. An optical article according to claim 1, further comprising an antireflection film laminated on the functional layer.

11. An optical article according to claim 10, further comprising an antifouling film laminated on the antireflection film.

12. An optical article according to claim 1, wherein the optical substrate is a plastic lens substrate.

13. An optical article according to claim 12, wherein the optical article is a spectacle lens.

14. A pair of spectacles comprising:
a spectacle lens according to claim 13, and
a frame to which the spectacle lens is mounted.

15. A system including an optical article according to claim 1 and for seeing an image through the optical article, the optical article facing the outside.

16. A method for producing of an optical article, comprising:
forming a light-transmissive functional layer on the surface of an optical substrate, the period Pk ($nm^{-1}$) of reflectance of the functional layer in the k-space being not more than $3.66 \times 10^{-5}$.

17. A method for film formation comprising:
forming a light-transmissive functional layer on the surface of an optical substrate, the period Pk ($nm^{-1}$) of reflectance of the functional layer in the k-space being not more than $3.66 \times 10^{-5}$.

* * * * *